US012609861B2

(12) United States Patent
Sasaki

(10) Patent No.: US 12,609,861 B2
(45) Date of Patent: Apr. 21, 2026

(54) ABNORMALITY MONITORING METHOD, ABNORMALITY MONITORING SYSTEM, AND PROGRAM

(71) Applicant: Panasonic Intellectual Property Management Co., Ltd., Osaka (JP)

(72) Inventor: Koji Sasaki, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 16 days.

(21) Appl. No.: 18/753,414

(22) Filed: Jun. 25, 2024

(65) Prior Publication Data

US 2024/0348491 A1 Oct. 17, 2024

Related U.S. Application Data

(63) Continuation of application No. PCT/JP2022/047539, filed on Dec. 23, 2022.

(30) Foreign Application Priority Data

Jan. 11, 2022 (JP) ................................. 2022-002481

(51) Int. Cl.
H04L 41/0631 (2022.01)
H04L 41/0677 (2022.01)
(Continued)

(52) U.S. Cl.
CPC ........ H04L 41/065 (2013.01); H04L 41/0677 (2013.01)

(58) Field of Classification Search
CPC . H04L 41/065; H04L 41/0677; H04L 43/045; H04L 43/0823; H04L 43/0864; H04L 43/10; H04L 43/16
See application file for complete search history.

(56) References Cited

U.S. PATENT DOCUMENTS 10,263,869 B1 * 4/2019 Dzierwinski ........... H04L 43/50
12,010,007 B1 * 6/2024 Wallace .................. H04L 43/16
(Continued)

FOREIGN PATENT DOCUMENTS

JP 2003-150407 5/2003
JP 2003-173299 6/2003
(Continued)

OTHER PUBLICATIONS

International Search Report issued Feb. 28, 2023 in International (PCT) Application No. PCT/JP2022/047539.

*Primary Examiner* — Kamal M Hossain
(74) *Attorney, Agent, or Firm* — Wenderoth, Lind & Ponack, L.L.P.

(57) ABSTRACT

An abnormality monitoring method is an abnormality monitoring method using a monitoring device communicably connected to a plurality of terminals via a network. The abnormality monitoring method includes: transmitting a request to a plurality of terminals; receiving one or more responses respectively transmitted in response to the request by one or more terminals among the plurality of terminals; determining, based on the one or more responses, whether or not an abnormality has occurred in at least one of (i) a first terminal of the plurality of terminals or (ii) a first communication route of the plurality of communication routes; generating abnormality information indicating that an abnormality has occurred in at least one of the first terminal or the first communication route when the abnormality has occurred; and presenting the abnormality information generated.

16 Claims, 12 Drawing Sheets

(51) Int. Cl.
    *H04L 43/045*      (2022.01)
    *H04L 43/0823*      (2022.01)
    *H04L 43/0864*      (2022.01)
    *H04L 43/10*      (2022.01)
    *H04L 43/16*      (2022.01)

(56) References Cited

U.S. PATENT DOCUMENTS

| | | | |
|---|---|---|---|
| 2007/0258476 A1 | 11/2007 | Habu et al. | |
| 2016/0294681 A1* | 10/2016 | Khakpour | H04L 45/22 |
| 2019/0034254 A1* | 1/2019 | Nataraj | G06F 11/0709 |
| 2020/0145313 A1* | 5/2020 | Raindel | H04L 43/106 |
| 2021/0359975 A1 | 11/2021 | Yamamoto | |
| 2022/0038356 A1* | 2/2022 | Hobgood | H04L 43/0852 |
| 2022/0116296 A1 | 4/2022 | Sasaki | |
| 2023/0198860 A1* | 6/2023 | Bothwell | H04L 43/10 709/224 |
| 2023/0421470 A1 | 12/2023 | Sasaki | |

FOREIGN PATENT DOCUMENTS

| | | |
|---|---|---|
| JP | 2009-239592 | 10/2009 |
| JP | 2010-257109 | 11/2010 |
| WO | 2006/046309 | 5/2006 |
| WO | 2020/115796 | 6/2020 |
| WO | 2021/005945 | 1/2021 |

\* cited by examiner

FIG. 2

| | REQUEST TYPE | REQUEST CONTENT | STATE |
|---|---|---|---|
| (a) | TERMINAL STATE REQUEST | • DISPLAY STATES<br>• CONNECTION STATE<br>• SETTING INFORMATION | • POWER: ON<br>• TEMPERATURE: NORMAL<br>• NETWORK: CONNECTED<br>• IP ADDRESS: 192.168.1.10<br>• MAC ADDRESS: aa: bb: cc<br>• OTHERS |
| (b) | ROUTE INFORMATION REQUEST | • ROUTE REQUEST | • Route A ⇒ Route B |
| (c) | RESPONSE TIME REQUEST | • RESPONSE TIME | • T msec |

FIG. 3

| TERMINAL INFORMATION | ROUTE INFORMATION (MONITORING DEVICE ⇔ TERMINAL) | RESPONSE TIME |
|---|---|---|
| TERMINAL A1 | Route A | Ta1 msec |
| TERMINAL A2 | Route A | Ta2 msec |
| TERMINAL B1 | Route B | Tb1 msec |
| TERMINAL B2 | Route B | Tb2 msec |
| TERMINAL C1 | Route C | Tc1 msec |
| ... | ... | ... |

FIG. 4

| TERMINAL INFORMATION | TARGET TERMINAL | ACQUIRED ROUTE INFORMATION (TERMINAL TO TERMINAL) | RESPONSE TIME |
|---|---|---|---|
| TERMINAL A1 | TERMINAL A2 | Route A | Ta1a2 msec |
| TERMINAL A1 | TERMINAL B1 | Route A ⇒ Route B | Ta1b1 msec |
| TERMINAL A1 | TERMINAL B2 | Route A ⇒ Route B | Ta1b2 msec |
| TERMINAL A1 | TERMINAL C1 | Route A ⇒ Route C | Ta1c1 msec |
| TERMINAL A2 | TERMINAL A1 | Route A | Ta2a1 msec |
| ... | ... | ... | ... |

FIG. 5

| TERMINAL INFORMATION | GROUP INFORMATION |
|---|---|
| TERMINAL A1 | GROUP A |
| TERMINAL A2 | GROUP A |
| TERMINAL B1 | GROUP B |
| TERMINAL B2 | GROUP B |
| TERMINAL C1 | GROUP C |
| ... | ... |

FIG. 10

| GROUP INFORMATION | TERMINAL INFORMATION | RESPONSE TIME | AVERAGE RESPONSE TIME | RESPONSE DIFFERENCE | INTER-GROUP AVERAGE RESPONSE TIME | INTER-GROUP RESPONSE DIFFERENCE |
|---|---|---|---|---|---|---|
| Group A | TERMINAL A1 | Tr-a1 | Tr-avrA | $\Delta$Ta1 | Tr-avrG | $\Delta$Tr-gA |
| Group A | TERMINAL A2 | Tr-a2 | | $\Delta$Ta2 | | |
| Group B | TERMINAL B1 | Tr-b1 | Tr-avrB | $\Delta$Tb1 | | $\Delta$Tr-gB |
| Group B | TERMINAL B2 | Tr-b2 | | $\Delta$Tb2 | | |
| Group C | TERMINAL C1 | Tr-c1 | Tr-avrC | $\Delta$Tc1 | | $\Delta$Tr-gC |
| ... | ... | ... | ... | ... | ... | ... |

FIG. 11

| TERMINAL INFORMATION | DELAY AMOUNT ANALYSIS ($\alpha$ COMPARISON) | DELAY DETERMINATION |
|---|---|---|
| TERMINAL A1 | $\lvert \Delta Ta1\text{-}\alpha \rvert > \alpha/2$ | DELAYED |
| TERMINAL A2 | $\lvert \Delta Ta2\text{-}\alpha \rvert > \alpha/2$ | NORMAL |
| TERMINAL B1 | $\lvert \Delta Tb1\text{-}\alpha \rvert > \alpha/2$ | DELAYED |
| TERMINAL B2 | $\lvert \Delta Tb2\text{-}\alpha \rvert > \alpha/2$ | DELAYED |
| TERMINAL C1 | $\lvert \Delta Tc1\text{-}\alpha \rvert > \alpha/2$ | NORMAL |
| ... | ... | ... |
| $\alpha$ = AVERAGE RESPONSE TIME EXCLUDING ABNORMAL RESPONSE TIME FROM RESPONSE TIMES OF ALL TERMINALS | | |

FIG. 12

| GROUP INFORMATION | DELAY AMOUNT ANALYSIS ($\beta$ COMPARISON) | DELAY DETERMINATION |
|---|---|---|
| Group A | $\lvert \Delta Tr\text{-}gA\text{-}\beta \rvert > \beta/2$ | NORMAL |
| Group B | $\lvert \Delta Tr\text{-}gB\text{-}\beta \rvert > \beta/2$ | DELAYED |
| Group C | $\lvert \Delta Tr\text{-}gC\text{-}\beta \rvert > \beta/2$ | NORMAL |
| $\beta$ = AVERAGE RESPONSE TIME OF ALL GROUPS EXCLUDING ABNORMAL RESPONSE TIME | | |

FIG. 13

| TERMINAL INFORMATION | TERMINAL COMMUNICATION STATE | GROUP COMMUNICATION STATE | ROUTE INFORMATION | FAILURE DETERMINATION (NOTIFIED) |
|---|---|---|---|---|
| TERMINAL A1 | ABNORMAL | NORMAL | Route A | TERMINAL FAILURE DETECTED |
| TERMINAL A2 | NORMAL | | Route A | NORMAL |
| TERMINAL B1 | ABNORMAL | ABNORMAL | Route A ⇒ Route B | ROUTE FAILURE DETECTED |
| TERMINAL B2 | ABNORMAL | | Route A ⇒ Route B | ROUTE FAILURE DETECTED |
| TERMINAL C1 | NORMAL | NORMAL | Route C | NORMAL |
| ... | ... | ... | ... | ... |

| TERMINAL INFORMATION | ROUTE INFORMATION (MONITORING DEVICE ⇔ TERMINAL) | RESPONSE TIME |
|---|---|---|
| TERMINAL C1 | Route C | Tc1 msec |
| TERMINAL C2 | Route C | Tc1 msec |
| TERMINAL C3 | Route C | Tc1 msec |
| TERMINAL C4 | Route C | Tc1 msec |

FIG. 17

| TERMINAL INFORMATION | GROUP INFORMATION |
|---|---|
| TERMINAL C1 | Group C -> SubGroup C1 |
| TERMINAL C2 | Group C -> SubGroup C1 |
| TERMINAL C3 | Group C -> SubGroup C2 |
| TERMINAL C4 | Group C -> SubGroup C2 |

FIG. 18

| TERMINAL INFORMATION | ROUTE INFORMATION (MONITORING DEVICE ⇔ TERMINAL) | RESPONSE TIME |
|---|---|---|
| TERMINAL C1 | Route C ⇒ Route C1 (TEMPORARY) | Tc1 msec |
| TERMINAL C2 | Route C ⇒ Route C1 (TEMPORARY) | Tc1 msec |
| TERMINAL C3 | Route C ⇒ Route C2 (TEMPORARY) | Tc2 msec |
| TERMINAL C4 | Route C ⇒ Route C2 (TEMPORARY) | Tc2 msec |

ABNORMALITY MONITORING METHOD, ABNORMALITY MONITORING SYSTEM, AND PROGRAM

BACKGROUND

1. Technical Field

The present disclosure relates to an abnormality monitoring method and an abnormality monitoring system for monitoring whether or not an abnormality occurs in a terminal and a network with respect to a plurality of terminals installed on a same network, and a program for causing a computer to execute the abnormality monitoring method.

2. Description of the Related Art

Patent Literature (PTL) 1 discloses a system for identifying a failure when a client terminal cannot use a web system.

PTL 1: Unexamined Japanese Patent Publication No. 2010-257109

SUMMARY

The conventional technique as in PTL 1 has a problem that it takes time to identify whether a failure has occurred in a client terminal itself or a failure has occurred in a network between a server and the client terminal.

The present disclosure provides an abnormality monitoring method, an abnormality monitoring system, and a program that enable a user to easily identify whether an abnormality has occurred in a terminal to be monitored or an abnormality has occurred in a network.

An abnormality monitoring method according to one aspect of the present disclosure is an abnormality monitoring method using a monitoring device communicably connected to a plurality of terminals via a network. An abnormality monitoring method includes: transmitting a request to the plurality of terminals via a plurality of communication routes between the monitoring device and the plurality of terminals; receiving one or more responses respectively transmitted in response to the request by one or more terminals of the plurality of terminals; determining, based on the one or more responses, whether or not an abnormality has occurred in at least one of (i) a first terminal of the plurality of terminals or (ii) a first communication route of the plurality of communication routes; generating abnormality information indicating that the abnormality has occurred in at least one of the first terminal or the first communication route when the abnormality has occurred; and presenting the abnormality information generated.

An abnormality monitoring system according to an aspect of the present disclosure is an abnormality monitoring system including a plurality of terminals and a monitoring device communicably connected to the plurality of terminals via a network. The monitoring device transmits a request to the plurality of terminals via a plurality of communication routes between the monitoring device and the plurality of terminals. Each of the plurality of terminals transmits a response in response to the request to the monitoring device when receiving the request from the monitoring device. The monitoring device receives one or more responses respectively transmitted in response to the request by one or more terminals of the plurality of terminals, determines, based on the one or more responses, whether or not an abnormality has occurred in at least one of (i) a first terminal of the plurality of terminals or (ii) a first communication route of the plurality of communication routes, generates abnormality information indicating that the abnormality has occurred in at least one of the first terminal or the first communication route when the abnormality has occurred, and presents the abnormality information generated.

Note that these general or specific aspects may be implemented by an apparatus, an integrated circuit, a computer program, or a non-transitory recording medium such as a computer-readable CD-ROM, or may be implemented by any combination of a method, a system, an apparatus, an integrated circuit, a computer program, and a non-transitory recording medium.

According to the abnormality monitoring method, the abnormality monitoring system, and the program in the present disclosure, the user can easily identify whether an abnormality has occurred in the terminal to be monitored or whether an abnormality has occurred in the network.

BRIEF DESCRIPTION OF THE DRAWINGS

FIG. 2 is a table for explaining types of requests.

FIG. 3 is information obtained by communication between each terminal and a monitoring device.

FIG. 4 is information obtained by communication between each terminal and another terminal.

FIG. 5 is a table illustrating group association information.

FIG. 10 is a diagram illustrating an example of each piece of information calculated in the abnormality determination processing.

FIG. 11 is a diagram illustrating an example of a determination result of abnormality determination of a terminal.

FIG. 12 is a diagram illustrating an example of a determination result of abnormality determination of a group.

FIG. 13 is a diagram illustrating an example of a determination result of abnormality determination of a terminal and a communication route.

FIG. 14 is a diagram illustrating an example of abnormality information.

FIG. 16 is a diagram illustrating a comparative example of route information.

FIG. 17 is a diagram illustrating an example of group management information.

FIG. 18 is a diagram illustrating an example of newly identified route information.

DETAILED DESCRIPTION

Knowledge as Basis of Present Disclosure

Figure 1:
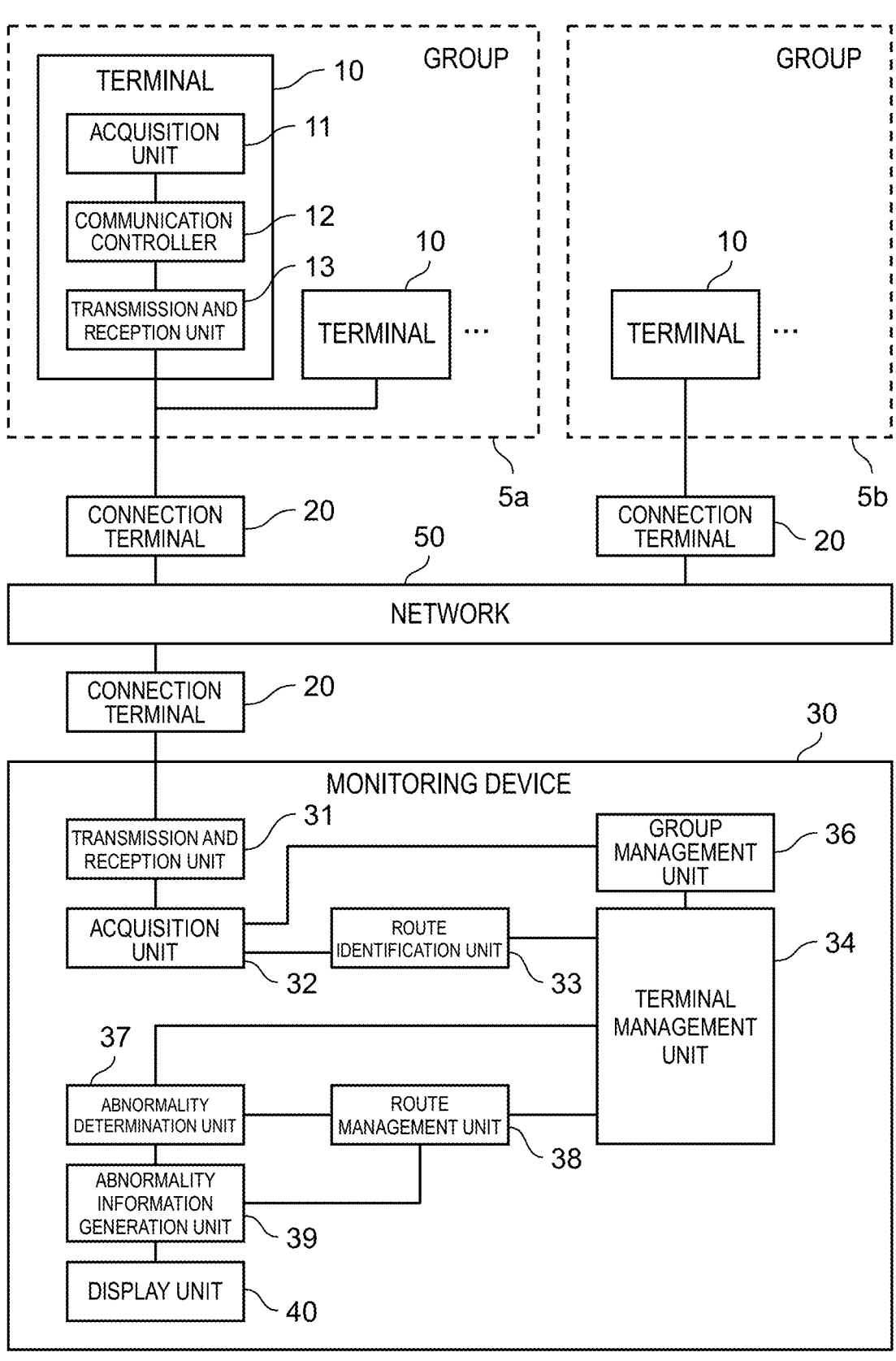
FIG. 1 is a block diagram illustrating an example of a configuration of an abnormality monitoring system according to an exemplary embodiment.

The present inventor has found that the following problems arise in the conventional system described in the section of "BACKGROUND".

In the related art, in a monitoring system that monitors a plurality of terminals installed on a same network, a communication state of a terminal to be monitored is periodically acquired, and occurrence of abnormality in the terminal is detected on the basis of the communication state. A plurality of terminals to be monitored in such a monitoring system often includes terminals connected via a plurality of network connection devices (network hub, router, etc.). In addition, many communication devices may be connected on the network in addition to the terminal to be monitored, which may affect the communication state of the terminal to be monitored. For this reason, when a communication state affected by an abnormality occurring in another communication device is acquired, there is a possibility that it is erroneously detected that an abnormality has occurred in the terminal although no abnormality has occurred in the terminal. In addition, it is difficult to identify a cause that affects the communication state of the terminal.

Therefore, the present inventors have intensively studied to find an abnormality monitoring method and the like by which a user can easily identify whether an abnormality has occurred in a terminal to be monitored or an abnormality has occurred in a network.

An abnormality monitoring method according to one aspect of the present disclosure is an abnormality monitoring method performed by a monitoring device communicably connected to a plurality of terminals via a network, the method including: transmitting a request to the plurality of terminals; receiving one or more responses transmitted by one or more terminals of the plurality of terminals in response to the request; when an abnormality has occurred in at least one of (i) one or more first terminals of the plurality of terminals or (ii) one or more first communication routes of a plurality of communication routes between the monitoring device and the plurality of terminals, generating abnormality information indicating at least one of the first terminal or the first communication route that the abnormality has occurred based on the one or more responses; and presenting the abnormality information generated.

According to this, in response to the request transmitted to the plurality of terminals, the abnormality information indicating at least one of the one or more first terminals or the one or more first communication routes in which the abnormality has occurred is generated based on the one or more responses respectively transmitted from the one or more terminals among the plurality of terminals, and the abnormality information is presented. Therefore, the user can identify at least one of the one or more first terminals or the one or more first communication routes in which the abnormality has occurred among the plurality of terminals and the plurality of communication routes only by confirming the presented abnormality information. That is, the user can easily identify whether an abnormality has occurred in the terminal to be monitored or an abnormality has occurred in the communication route on the network.

In addition, each of the one or more responses received by the monitoring device may include one or more pieces of device information indicating one or more communication devices on the network, the response having passed the one or more communication devices between the terminal that has transmitted the response and the monitoring device, and each of the plurality of communication routes may be identified by one or more pieces of device information included in the response transmitted from the terminal corresponding to the communication route.

According to this, a communication route from one or more terminals that have transmitted one or more responses to the monitoring device is identified based on one or more pieces of device information included in each of the one or more responses. For this reason, for example, it is possible to identify a communication route in which an abnormality has occurred by determining whether or not an abnormality has occurred in each of one or more communication devices.

Further, the abnormality information may be generated based on one or more measured values respectively corresponding to the one or more terminals obtained by receiving the one or more responses, the one or more measured values may be generated corresponding to the one or more responses, respectively, and each of the one or more measured values may be correlated with evaluation of communication quality between a terminal that has transmitted a response corresponding to the measured value of the one or more responses and the monitoring device.

According to this, the abnormality information is generated based on one or more measured values. Each of the one or more measured values correlates with the evaluation of the communication quality between the corresponding terminal and the monitoring device. Therefore, it is possible to accurately identify at least one of the one or more first terminals or the one or more first communication routes that have caused the abnormality.

In addition, in a case where the number of the one or more terminals is smaller than the number of the plurality of terminals, one or more other measured values different from the one or more measured values of the plurality of measured values may correspond to one or more other terminals different from the one or more terminals of the plurality of terminals, and the one or more other measured values may indicate that the one or more other measured values are generated by the monitoring device failing to receive, in a predetermined period, one or more other responses in response to the request from the one or more other terminals, and are lower than the evaluation of the communication quality of the one or more measured values.

According to this, since the evaluation of the one or more other measured values is determined to be lower than the evaluation of the one or more measured values, it is possible to determine that an abnormality has occurred in any of the one or more other terminals corresponding to the response that the monitoring device has not been able to receive in the predetermined period and the one or more communication routes between the one or more other terminals and the monitoring device. Therefore, it is possible to accurately identify at least one of the one or more first terminals or the one or more first communication routes that have caused the abnormality.

Further, in the abnormality information, one or more first terminals respectively corresponding to one or more first measured values included in a first numerical range indicating that evaluation of communication quality is lower than a first threshold among the plurality of measured values may be indicated as terminals in which the abnormality has occurred, and the plurality of terminals may include the one or more first terminals.

Therefore, by receiving one or more responses, one or more first terminals having low evaluation of communication quality among the plurality of terminals can be identified as terminals in which an abnormality has occurred.

Further, in the abnormality information, one or more second terminals respectively corresponding to one or more second measured values included in a second numerical range indicating that the evaluation of the communication quality is higher than the first threshold among the plurality of measured values may be indicated as terminals in which the abnormality has not occurred.

Therefore, by receiving a plurality of responses, one or more second terminals having high evaluation of communication quality among the plurality of terminals can be identified as terminals in which abnormality has not occurred.

In addition, the plurality of terminals may include a plurality of first group terminals belonging to a first group, the plurality of first group terminals may communicate with the monitoring device via a first communication device of the one or more communication devices, the plurality of measured values may include a plurality of first group measured values respectively generated corresponding to the plurality of first group terminals, and in the abnormality information, when each of the plurality of first group measured values is included in a third numerical range indicating that evaluation of communication quality is lower than a second threshold, a first communication route via the first communication device may be indicated as a communication route in which the abnormality has occurred.

In a case where each of the plurality of first group measured values is included in the third numerical range indicating that the evaluation of the communication quality is lower than the second threshold, it is considered that the cause is a possibility that an abnormality has occurred in all of the plurality of first group terminals and a possibility that an abnormality has occurred in the first communication route. Therefore, in a case where each of the plurality of first group measured values is included in the third numerical range indicating that the evaluation of the communication quality is lower than the second threshold, it is possible to notify the user that there is a possibility that an abnormality has occurred also in the first communication route by indicating the first communication route as a communication route in which an abnormality has occurred in the abnormality information.

The plurality of terminals may further include a plurality of second group terminals belonging to a second group, the plurality of second group terminals may communicate with the monitoring device via a second communication device of the one or more communication devices, the plurality of measured values may further include a plurality of second group measured values respectively generated corresponding to the plurality of second group terminals, and in the abnormality information, when at least one of the plurality of second group measured values is included in a fourth numerical range indicating that the evaluation of the communication quality is higher than the second threshold, a second communication route via the second communication device may be indicated as a communication route in which the abnormality has not occurred.

In a case where at least one of the plurality of second group measured values is included in the fourth numerical range indicating that the evaluation of the communication quality is higher than the second threshold, it is considered that no abnormality has occurred in the second communication route. Therefore, in a case where at least one of the plurality of second group measured values is included in the fourth numerical range indicating that the evaluation of the communication quality is higher than the second threshold, it is possible to notify the user that no abnormality has occurred in the second communication route by indicating the second communication route as a communication route in which no abnormality has occurred in the abnormality information.

Each of the one or more measured values may be a response period from a first time at which the monitoring device has transmitted the request to the terminal to which the measured value corresponds among the plurality of terminals to a second time at which a response transmitted by the terminal is received.

In addition, each of the one or more responses may include the number of times of retransmission of the response by a terminal that has transmitted the response among the one or more terminals, and each of the one or more measured values may be the number of times of retransmission included in the response to which the measured value corresponds.

In addition, each of the one or more responses may include the number of times of errors that have occurred in transmission of the response by a terminal that has transmitted the response among the one or more terminals, and each of the one or more measured values may be the number of times of occurrence included in the response to which the measured value corresponds.

In addition, each of the one or more measured values may be the number of times of retransmission of the request by the monitoring device to a terminal to which the measured value corresponds among the one or more terminals.

In addition, each of the one or more measured values may be the number of times of errors that have occurred in transmission of the request by the monitoring device to a terminal to which the measured value corresponds among the one or more terminals.

In the abnormality information, the one or more first terminals in which an abnormality has occurred may be indicated in a display mode different from that of other terminals in which an abnormality has not occurred, and the one or more first communication routes in which an abnormality has occurred may be indicated in a display mode different from that of other communication routes in which an abnormality has not occurred.

Therefore, the user can distinguish and visually recognize the terminal in which the abnormality has occurred and the terminal in which the abnormality has not occurred. In addition, the user can distinguish and visually recognize a communication route in which an abnormality has occurred and a communication route in which no abnormality has occurred.

An abnormality monitoring system according to one aspect of the present disclosure is an abnormality monitoring system including a plurality of terminals and a monitoring device communicably connected to the plurality of terminals via a network, in which the monitoring device transmits a request to the plurality of terminals, receives one or more responses transmitted from one or more terminals of the plurality of terminals in response to the request, and based on the one or more responses, when an abnormality has occurred in at least one of (i) one or more first terminals of the plurality of terminals or (ii) one or more first communication routes of a plurality of communication routes between the monitoring device and the plurality of terminals, generates abnormality information indicating at least one of the one or more first terminals or the one or more first communication routes in which the abnormality has occurred, and presents the abnormality information generated, and each of the plurality of terminals transmits a response according to the request to the monitoring device when receiving the request from the monitoring device.

According to this, in response to the request transmitted to the plurality of terminals, the abnormality information indicating at least one of the one or more first terminals or the one or more first communication routes in which the abnormality has occurred is generated based on the one or more responses respectively transmitted from the one or more terminals among the plurality of terminals, and the abnormality information is presented. Therefore, the user can identify at least one of the one or more first terminals or the one or more first communication routes in which the abnormality has occurred among the plurality of terminals and the plurality of communication routes only by confirming the presented abnormality information. That is, the user can easily identify whether an abnormality has occurred in the terminal to be monitored or an abnormality has occurred in the communication route on the network.

Note that these general or specific aspects may be implemented by an apparatus, an integrated circuit, a computer program, or a non-transitory recording medium such as a computer-readable CD-ROM, or may be implemented by any combination of a method, a system, an apparatus, an integrated circuit, a computer program, and a non-transitory recording medium.

Hereinafter, exemplary embodiments will be described in detail with appropriate reference to the drawings. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art.

Note that the accompanying drawings and the following description are provided for those skilled in the art to fully understand the present disclosure, and are not intended to limit the subject matter described in the claims.

EXEMPLARY EMBODIMENT

An exemplary embodiment will be described below with reference to FIGS. 1 to 14.

[1-1. Configuration]

[1-1-1. Configuration of Abnormality Monitoring System]

FIG. 1 is a block diagram illustrating an example of a configuration of an abnormality monitoring system according to an exemplary embodiment.

The abnormality monitoring system includes a plurality of terminals 10 and monitoring device 30. The plurality of terminals 10 are connected to network 50 via connection terminals 20. In addition, the monitoring device 30 is connected to network 50 via connection terminal 20. That is, the plurality of terminals 10 and monitoring device 30 are communicably connected via network 50.

The plurality of terminals 10 include a plurality of terminals 10 belonging to group 5a and a plurality of terminals 10 belonging to group 5b. The plurality of terminals 10 belonging to group 5a are connected to network 50 via common connection terminal 20. The plurality of terminals 10 belonging to group 5b are connected to network 50 via common connection terminal 20. Note that the number of terminals 10 belonging to each group may be one. Connection terminal 20 to which the plurality of terminals 10 belonging to group 5a are connected and connection terminal 20 to which the plurality of terminals 10 belonging to group 5b are connected are different from each other. Two connection terminals 20 and connection terminal 20 to which monitoring device 30 is connected may be different from each other.

In each of the plurality of terminals 10, the state of terminal 10 is monitored by monitoring device 30. That is, each of the plurality of terminals 10 is a terminal to be monitored by monitoring device 30. The plurality of terminals 10 may be realized by, for example, a display terminal such as a liquid crystal display, an organic electro-luminescence (EL) display, or a projector, or may be realized by an imaging terminal such as a camera.

Monitoring device 30 is a device that monitors the state of each of the plurality of terminals 10. In addition, monitoring device 30 is a device that monitors a communication state of a plurality of communication routes with each of the plurality of terminals 10. Monitoring device 30 transmits a request to the plurality of terminals 10, and receives one or more responses respectively transmitted by one or more terminals 10 among the plurality of terminals 10 in response to the transmitted request. Then, monitoring device 30 acquires the state of each of the plurality of terminals 10 and the communication state of the plurality of communication routes with each of the plurality of terminals 10 based on the received one or more responses. When an abnormality has occurred in at least one of one or more terminals 10 among the plurality of terminals 10 or one or more communication routes among the plurality of communication routes based on the communication states of the plurality of terminals 10 and the communication states of the plurality of communication routes, monitoring device 30 generates abnormality information indicating at least one of the one or more terminals 10 or the one or more communication routes in which the abnormality has occurred, and presents the abnormality information generated. Monitoring device 30 may be realized by, for example, an information processing apparatus such as a personal computer (PC).

Each of the plurality of connection terminals 20 is realized by a network hub, a router, or the like.

Network 50 may be a general-purpose network such as the Internet or a dedicated network.

[1-1-2. Configuration of Terminal]

Next, configurations of the plurality of terminals 10 will be described. Since the configurations of the plurality of terminals 10 are common, the configuration of one terminal 10 will be described.

Terminal 10 includes acquisition unit 11, communication controller 12, and transmission and reception unit 13. Transmission and reception unit 13 receives the request transmitted from monitoring device 30. Communication controller 12 analyzes the request received by transmission and reception unit 13. Acquisition unit 11 acquires various types of information requested in the received request according to the analysis result of the request by communication controller 12. In addition, acquisition unit 11 acquires the measurement information by measuring the communication state at the time of receiving the request. The measurement information includes, for example, communication traffic, a network communication state, and the like. Furthermore, the measurement information may include the number of times of retransmission of a response to a request by terminal 10 as a measured value. Furthermore, the measurement information may include, as a measured value, the number of times of errors that have occurred in transmission of a response to the request by terminal 10. Every time acquisition unit 11 measures the communication state, communication controller 12 may accumulate the measured communication state in a storage device (not illustrated) included in terminal 10. Transmission and reception unit 13 transmits a response including various types of information and measurement information acquired by acquisition unit 11 to monitoring device 30 as a response to the received request.

Note that each component included in terminal 10 may be configured by dedicated hardware or implemented by executing a software program suitable for each component. Each component may be implemented by a program execution unit such as a CPU or a processor reading and executing a software program recorded in a recording medium such as a hard disk or a semiconductor memory.

[1-1-3. Configuration of Monitoring Device]

Next, a configuration of monitoring device 30 will be described.

Monitoring device 30 includes transmission and reception unit 31, acquisition unit 32, route identification unit 33, terminal management unit 34, inter-group information acquisition unit 35, group management unit 36, abnormality determination unit 37, route management unit 38, abnormality information generation unit 39, and display unit 40.

Transmission and reception unit 31 receives one or more responses transmitted by one or more terminals 10 among the plurality of terminals 10 in response to a request from monitoring device 30. One or more terminals 10 are terminals that can transmit a response in response to the above request among the plurality of terminals 10. That is, in a case where all of the plurality of terminals 10 can transmit the response, one or more terminals 10 are the same as all of the plurality of terminals 10.

Note that each of the one or more responses received by monitoring device 30 includes terminal information on terminal 10 that has transmitted the response and one or more pieces of device information. The terminal information includes individual setting information such as an IP address of terminal 10 that has transmitted the response including the terminal information. Furthermore, the terminal information may further include group information for identifying a group to which this terminal 10 belongs. Each of the one or more pieces of device information indicates the one or more communication devices on the network through which the response including the device information has passed between terminal 10 that has transmitted the response and monitoring device 30. The one or more communication devices include, for example, connection terminal 20 for connecting terminal 10 to network 50 and connection terminal 20 for connecting monitoring device 30 to network 50. Each of the one or more pieces of device information may be any information as long as the information can identify the one or more communication devices. Each of the one or more responses may further include measurement information.

Acquisition unit 32 generates a request to be transmitted to the plurality of terminals 10, and transmits the generated request to the plurality of terminals 10 via transmission and reception unit 31. FIG. 2 is a table for explaining types of requests. The request may be periodically generated and transmitted to the plurality of terminals 10, or may be transmitted to the plurality of terminals 10 when predetermined information is received.

For example, as illustrated in FIG. 2, the request includes a terminal state request for requesting transmission of the state of terminal 10, a route information request for requesting the route information, a communication state request for requesting transmission of the communication state of terminal 10, and the like, with respect to terminal 10 to be monitored. The state of terminal 10 requested in the terminal state request includes, for example, an operation state, a display state, a connection state, setting information, and the like, and specifically includes a power on/off state, a temperature, a connection state to a network, an IP address, a MAC address, and the like. The other information includes warning information and error information indicating abnormality of terminal 10 in stages. The warning information and the error information may be presented when an intake temperature of the cooling fan of terminal 10, an amount of dust sucked by the cooling fan, or the like exceeds a predetermined threshold. That is, it may be determined that an abnormality has occurred in terminal 10 when an intake temperature of a cooling fan of the terminal 10, an amount of dust sucked by the cooling fan, or the like exceeds a predetermined threshold. The predetermined threshold may include a first threshold that serves as a trigger for generating warning information and a second threshold that serves as a trigger for generating error information and is larger than the first threshold. The route information requested in the route information request includes, for example, a route request, and indicates that information is exchanged through a route A via a router A and a route B via a router B. The communication state request (response time request) is, for example, a time from when monitoring device 30 issues an arbitrary transmission request to terminal 10 to when monitoring device 30 receives a response to the transmission request from terminal 10.

Note that, for each of the one or more received responses, acquisition unit 32 may measure, as a response time of each terminal 10, a time from the first time at which a request for the response is transmitted to the plurality of terminals 10 via transmission and reception unit 31 to the second time at which the response is received, and generate measurement information including a response time obtained by the measurement as a measured value. In addition, acquisition unit 32 may generate measurement information including the number of times of retransmission of a request from monitoring device 30 to each terminal 10 as a measured value. In addition, acquisition unit 32 may generate measurement information including, as a measured value, the number of times of errors that have occurred in transmission of a request by monitoring device 30 to each terminal 10.

In addition, acquisition unit 32 may associate the generated measurement information with terminal information of terminal 10 corresponding to the measurement information. The measured value included in the measurement information correlates with the evaluation of the communication quality between the terminal that has transmitted the response including the measurement information including the measured value or the response from which the measurement information including the measured value is generated and the monitoring device 30. For example, a longer response time indicates a lower communication quality, a larger number of times of retransmission of a response or a request indicates a lower communication quality, and a larger number of times of errors indicates a lower communication quality.

In addition, in a case where acquisition unit 32 fails to receive the response from all of the plurality of terminals 10, that is, in a case where the number of one or more terminals 10 corresponding to the one or more responses is smaller than the number of all of the plurality of terminals 10, acquisition unit 32 may generate the measurement information of one or more other terminals 10 from which the response cannot be received as follows. That is, the one or more pieces of measurement information of the one or more other terminals 10 may indicate that the one or more pieces of measurement information are generated when monitoring device 30 has failed to receive the one or more other responses according to the request from the one or more other terminals 10 in the predetermined period, and are lower than the evaluation of the communication quality of the one or more measured values acquired according to the received one or more responses.

In addition, acquisition unit 32 acquires, for each of one or more responses received by transmission and reception unit 31, terminal information which is included in the response and relates to terminal 10 that has transmitted the response and one or more pieces of device information, and outputs a data set of the terminal information and the one or more pieces of device information acquired for each response to route identification unit 33.

Route identification unit 33 acquires a plurality of data sets from acquisition unit 32, and identifies a communication route of terminal 10 identified by the terminal information for each of the plurality of data sets based on the terminal information and one or more pieces of device information included in the data sets. The communication route is identified by a combination of one or more pieces of device information included in the response transmitted from terminal 10 corresponding to the communication route, that is, terminal 10 identified by the terminal information.

Terminal management unit 34 stores each data set for each piece of terminal information included in the data set. Specifically, terminal management unit 34 stores one or more pieces of device information and measurement information included in each data set in association with the terminal information. Terminal management unit 34 may store the data set included in the periodically received response in association with the time when the response is received.

FIGS. 3 and 4 are tables illustrating route information and response times stored for each terminal. FIG. 3 is information obtained by communication between each terminal 10 and monitoring device 30. FIG. 4 is information obtained by communication between each terminal 10 and another terminal 10.

In the table of FIG. 3, for each of terminal A1, terminal A2, terminal B1, terminal B2, and terminal C2 which are the plurality of terminals 10, the terminal information of the terminal, the route information, and the response time between monitoring device 30 and the terminal are associated with each other.

In the table of FIG. 4, route information between terminal A1 and each of other terminals A2, B1, B2, and C2 is associated with a response time between the terminal and the terminal.

Furthermore, as illustrated in FIG. 5 to be described later, terminal management unit 34 may store the terminal information in association with the group information. FIG. 5 is a table illustrating group association information. As a result, terminal management unit 34 can store each data set for each terminal information and for each group information. In a case where the group information is included in each of the one or more responses, terminal management unit 34 may store each data set for each group information based on the group information included in each of the one or more responses. In addition, terminal management unit 34 may store each data set for each group information based on the group association information generated by group management unit 36.

Group management unit 36 may generate group information indicating a group for classifying the plurality of terminals 10 based on an input from the user. Group management unit 36 may generate group association information in which the group information is associated with a plurality of pieces of terminal information indicating a plurality of terminals belonging to the group indicated by the group information, and output the group association information to terminal management unit 34.

Abnormality determination unit 37 determines whether or not an abnormality has occurred in each terminal 10 based on the data set for each terminal managed by terminal management unit 34. Specifically, for each of the plurality of terminals 10, abnormality determination unit 37 determines whether the measured value included in the measurement information of terminal 10 is included in the first numerical range or the second numerical range. When determining that the measured value included in the measurement information of terminal 10 is included in the first numerical range, abnormality determination unit 37 determines that an abnormality has occurred in terminal 10 corresponding to the measured value. The first numerical range is a numerical range of the measured value indicating that the evaluation of the communication quality is lower than the first threshold. When the measured value included in the measurement information of terminal 10 is included in the second numerical range, abnormality determination unit 37 determines that no abnormality has occurred in terminal 10 corresponding to the measured value. The second numerical range is a numerical range of the measured value indicating that the evaluation of the communication quality is higher than the first threshold.

In addition, abnormality determination unit 37 determines whether or not an abnormality has occurred in all of the one or more terminals 10 included in each group based on the data set for each group managed by terminal management unit 34. For each of the one or more groups, abnormality determination unit 37 determines whether each of all the measured values of the one or more terminals 10 included in the group is included in the third numerical range or whether at least one of the one or more terminals 10 is included in the fourth numerical range. When determining that all the one or more measured values included in all of the one or more pieces of measurement information of the one or more terminals 10 included in the group are included in the third numerical range, abnormality determination unit 37 determines that an abnormality has occurred in a communication route through connection terminal 20 connecting the one or more terminals 10 of the group to network 50. The third numerical range is a numerical range of the measured value indicating that the evaluation of the communication quality is lower than the second threshold. When at least one measured value of one or more terminals 10 included in the group is included in the fourth numerical range, abnormality determination unit 37 determines that no abnormality has occurred in the communication route through connection terminal 20 connecting the one or more terminals 10 of the group to network 50. The fourth numerical range is a numerical range of the measured value indicating that the evaluation of the communication quality is higher than the second threshold.

Here, the first threshold and the second threshold may be the same as or different from each other. When the first threshold and the second threshold are the same as each other, the first numerical range and the third numerical range are the same as each other, and the second numerical range and the fourth numerical range are the same as each other.

The determination by abnormality determination unit 37 may be performed at a plurality of predetermined times, may be performed at a timing when a request is transmitted and one or more responses to the request are received, or may be performed at a timing instructed by the user.

Abnormality information generation unit 39 generates abnormality information according to a determination result by abnormality determination unit 37. Specifically, in the abnormality information, one or more first terminals respectively corresponding to one or more first measured values included in the first numerical range indicating that the evaluation of the communication quality is lower than the first threshold among the plurality of measured values are indicated as terminals in which an abnormality has occurred. Further, in the abnormality information, one or more second terminals respectively corresponding to one or more second measured values included in the second numerical range indicating that the evaluation of the communication quality is higher than the first threshold among the plurality of measured values may be indicated as terminals in which no abnormality has occurred.

In the abnormality information, when each of the plurality of first group measured values is included in the third numerical range indicating that the evaluation of the communication quality is lower than the second threshold, the first communication route through the first communication device is indicated as the communication route in which the abnormality has occurred. The plurality of first group measured values are measured values generated respectively corresponding to the plurality of first group terminals. The plurality of first group terminals are terminals that perform communication with monitoring device 30 via the first communication device among the one or more communication devices, and belong to the first group.

In the abnormality information, when at least one of the plurality of second group measured values is included in the fourth numerical range indicating that the evaluation of the communication quality is higher than the second threshold, the second communication route through the second communication device is indicated as a communication route in which no abnormality has occurred. The plurality of second group measured values are measured values generated respectively corresponding to the plurality of second group terminals. The plurality of second group terminals are terminals that perform communication with monitoring device 30 via the second communication device among the one or more communication devices, and belong to the second group.

In the abnormality information, the one or more first terminals in which an abnormality has occurred may be indicated in a display mode different from that of other terminals in which an abnormality has not occurred, and the one or more first communication routes in which an abnormality has occurred may be indicated in a display mode different from that of other communication routes in which an abnormality has not occurred. That is, the abnormality information is information indicating that an abnormality has occurred in at least one of the first terminal or the first communication route.

Display unit 40 presents the abnormality information to the user by displaying the abnormality information generated by abnormality information generation unit 39. Display unit 40 is realized by a liquid crystal display, an organic EL display, or the like.

Each component included in monitoring device 30 may be configured by dedicated hardware, or implemented by executing a software program suitable for each component. Each component may be implemented by a program execution unit such as a CPU or a processor reading and executing a software program recorded in a recording medium such as a hard disk or a semiconductor memory.

[1-2. Operation]

Figure 6:
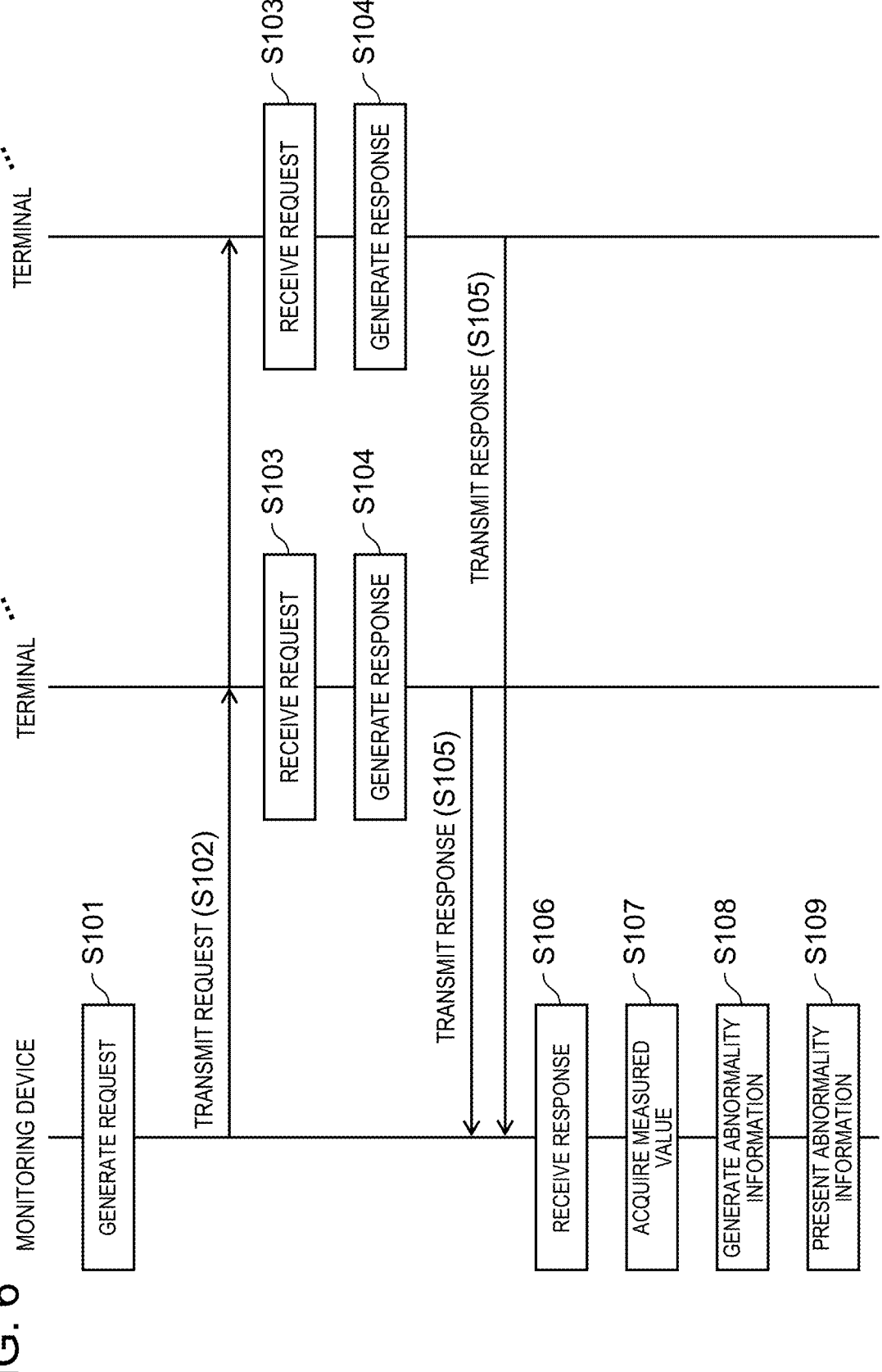
FIG. 6 is a sequence diagram illustrating an example of an operation of the abnormality monitoring system according to the exemplary embodiment.

An operation of the abnormality monitoring system configured as described above will be described. FIG. 6 is a sequence diagram illustrating an example of the operation of the abnormality monitoring system according to the exemplary embodiment. Although two terminals are illustrated in FIG. 6, the two terminals are terminals belonging to different groups.

First, monitoring device 30 generates a request at a predetermined timing (S101).

Next, monitoring device 30 transmits the generated request to the plurality of terminals 10 (S102).

Next, each of the plurality of terminals 10 receives the request (S103), and generates a response according to the request (S104).

Then, each of the plurality of terminals 10 transmits the generated response to monitoring device 30 (S105). Details of step S105 will be described later with reference to FIG. 7.

Monitoring device 30 receives a plurality of responses from a plurality of terminals 10 (S106).

Monitoring device 30 acquires a plurality of measured values respectively corresponding to the plurality of terminals 10 based on the plurality of responses (S107).

Monitoring device 30 generates the abnormality information based on the plurality of measured values (S108), and presents the abnormality information generated (S109).

Figure 7:
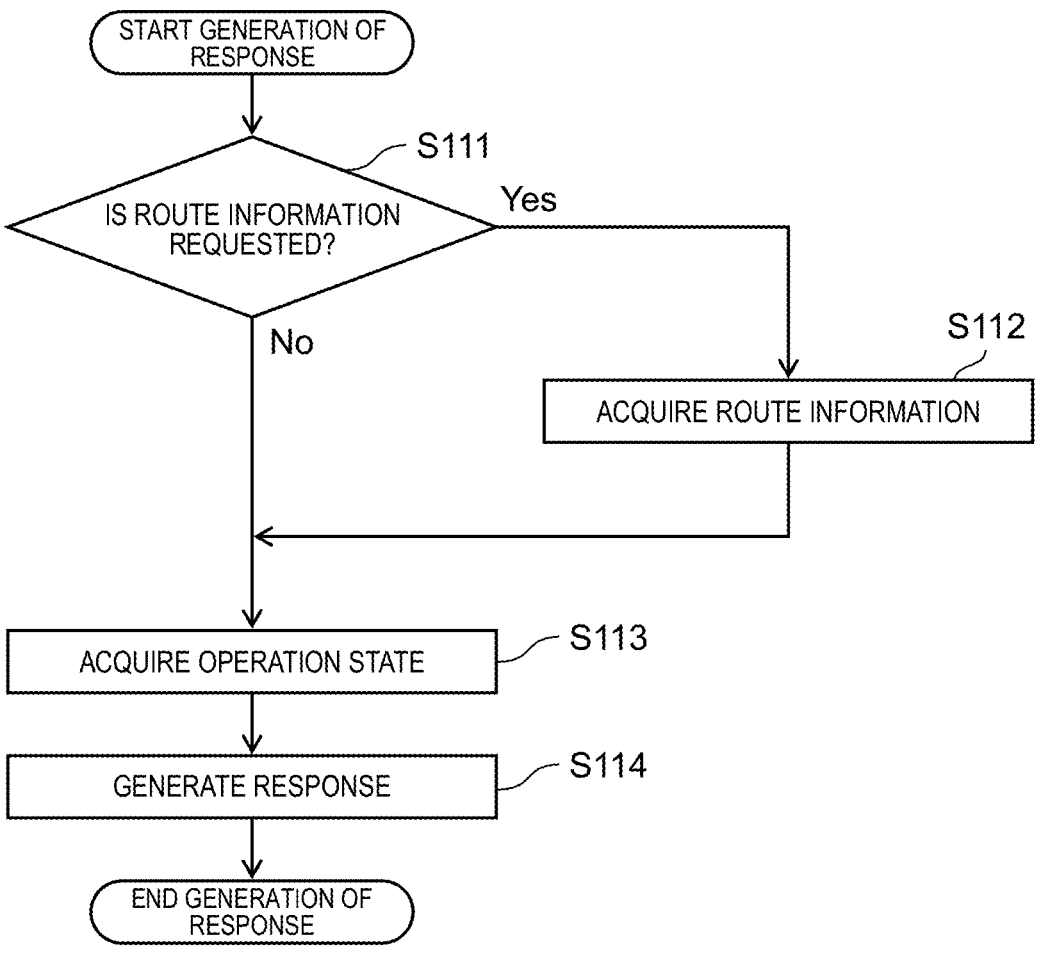
FIG. 7 is a flowchart illustrating an example of response generation processing in a terminal.

FIG. 7 is a flowchart illustrating an example of response generation processing in a terminal.

In step S105, terminal 10 determines whether or not the request includes a route information request (S111).

When the request includes the route information request (Yes in S111), terminal 10 acquires the route information (S112). The route information may be generated based on one or more pieces of device information included in the request and indicating one or more communication devices through which the request has passed until being received by terminal 10.

When the request does not include the route information request (No in S111), terminal 10 acquires the operation state of terminal 10 (S113).

Terminal 10 generates a response including the acquired operation state (S114). When acquiring the route information, terminal 10 generates a response including the operation state and the route information.

[1-2-1. Connection Example of Terminal to be Monitored]

Figure 8:
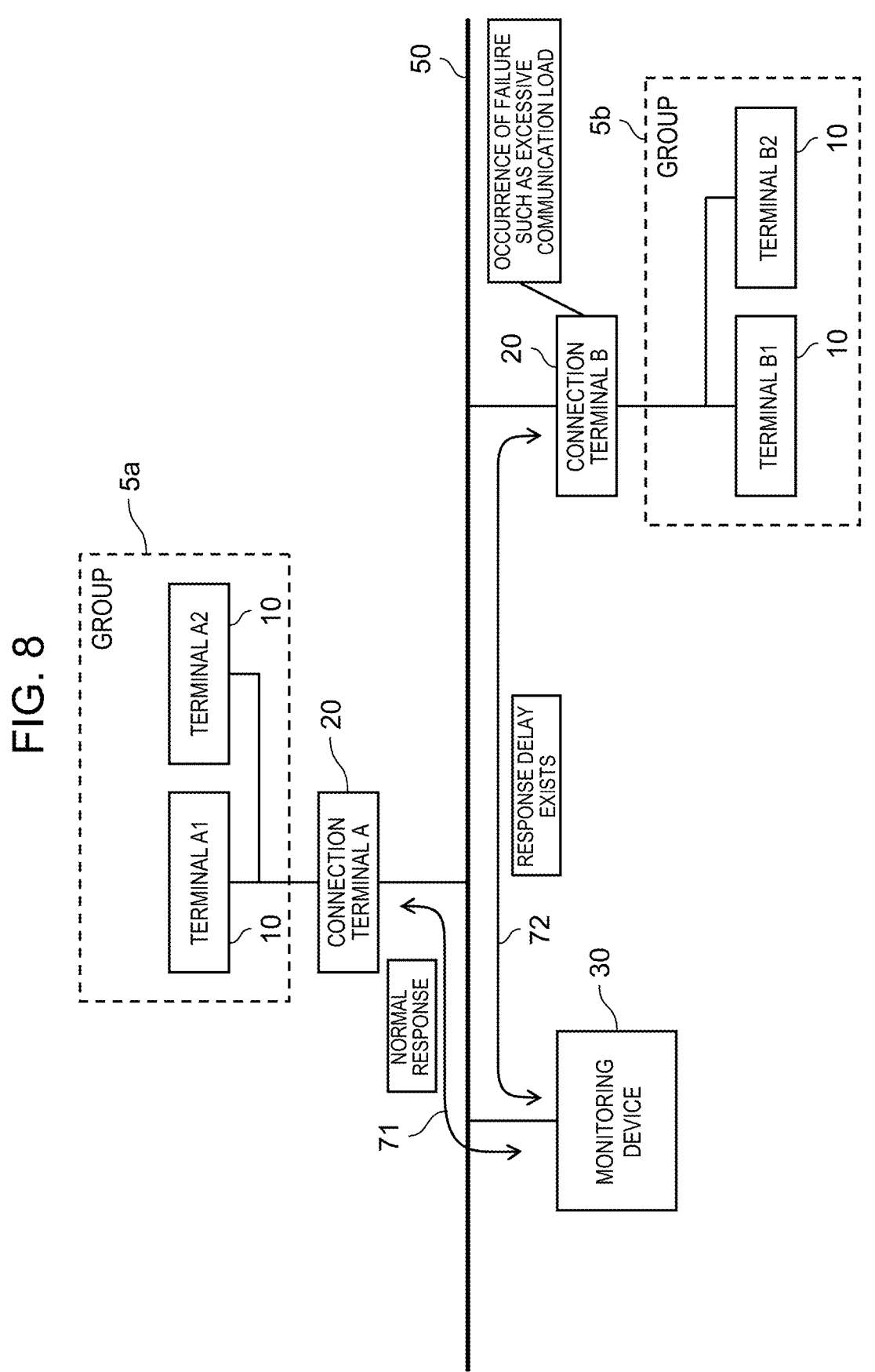
FIG. 8 is a diagram for describing an example of a case where a failure occurs at the time of state acquisition of a plurality of terminals installed on a network.

FIG. 8 is a diagram for describing an example of a case where a failure has occurred at the time of state acquisition of a plurality of terminals installed on a network.

In FIG. 8, the plurality of terminals 10 to be monitored by monitoring device 30 include terminal A1, terminal A2, terminal B1, and terminal B2. Terminal A1 and terminal A2 are classified into group 5a (group A), and terminal B1 and terminal B2 are classified into group 5b (group B). Terminal A1 and terminal A2 belonging to group 5a are connected to network 50 by connection terminal A among the plurality of connection terminals 20. Terminal B1 and terminal B2 belonging to group 5b are connected to network 50 by connection terminal B among the plurality of connection terminals 20.

Monitoring device 30 transmits a request for acquiring the communication states of the plurality of terminals 10 at a plurality of predetermined times. Accordingly, it is assumed that monitoring device 30 has received response 71 from terminals A1 and A2 of group 5a and has received response 72 from terminals B1 and B2 of group 5b. Response 71 is a response received within a normal response time, and response 72 is a response that was not able to be received within the normal response time. For example, when a communication failure such as concentration of a communication load has occurred in connection device B for connecting terminal B1 and terminal B2 of group 5b to network 50, response 72 is not able to be received within a normal response time. Therefore, monitoring device 30, when being not able to receive a response from all terminals B1 and B2 of group 5b within the normal response time, may determine that an abnormality has occurred in connection terminal B.

[1-2-2. Abnormality Determination Processing of Abnormality Determination Unit]

Figure 9:
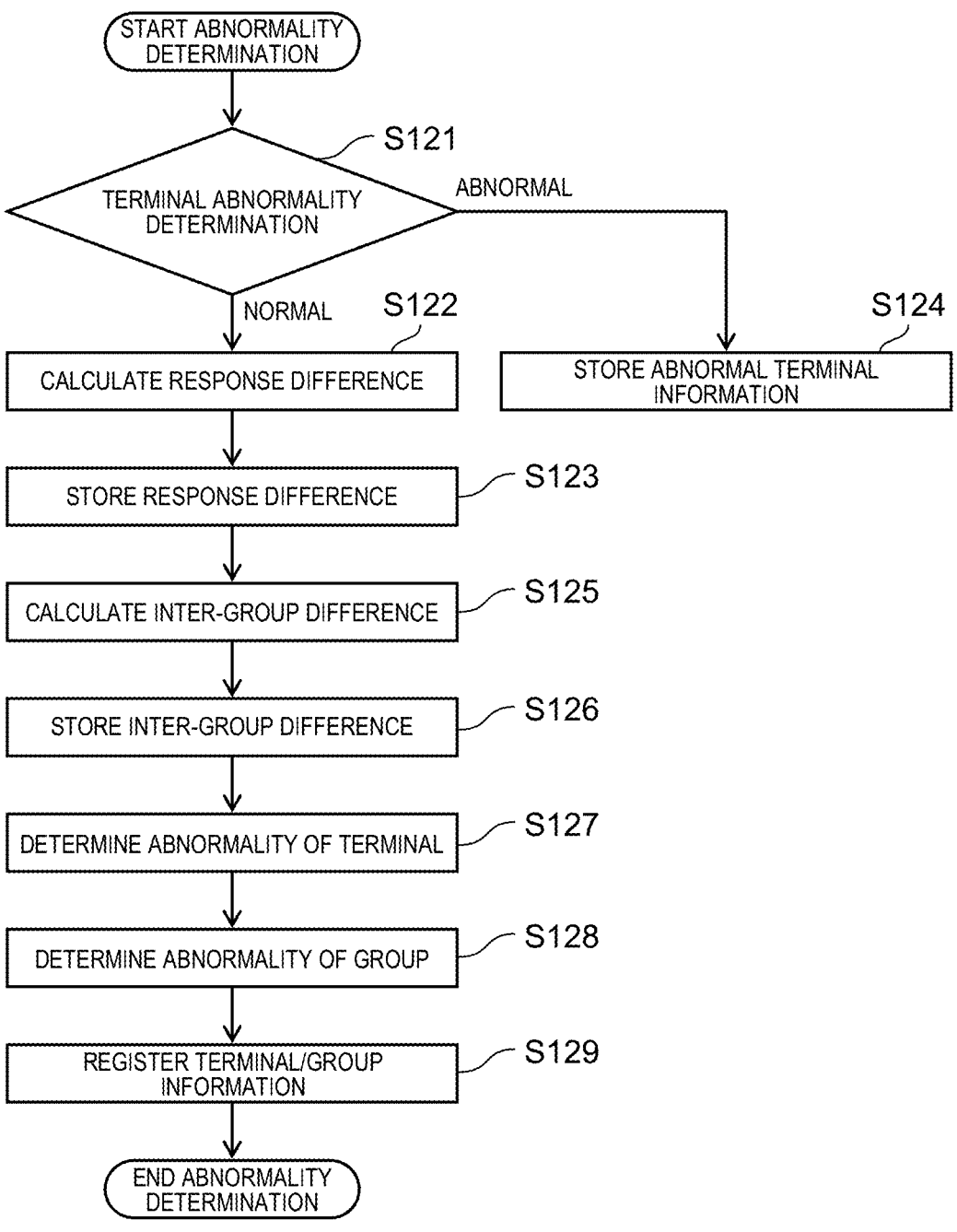
FIG. 9 is a flowchart illustrating an example of abnormality determination processing by an abnormality determination unit.

FIG. 9 is a flowchart illustrating an example of abnormality determination processing by the abnormality determination unit. FIG. 10 is a diagram illustrating an example of each piece of information calculated in the abnormality determination processing.

First, abnormality determination unit 37 of monitoring device 30 performs the terminal abnormality determination to determine whether each of the acquired one or more measured values is included in the first numerical range where the measured value is not normal or the normal second numerical range where the measured value is normal (S121). When the measured value is included in the first numerical range, abnormality determination unit 37 determines that the terminal corresponding to the measured value is abnormal, and when the measured value is included in the second numerical range, the abnormality determination unit 37 determines that the terminal corresponding to the measured value is normal.

When the measured value is included in the normal second numerical range, abnormality determination unit 37 calculates a response difference (S122) and stores the calculated response difference in a storage device such as a memory (S123). As illustrated in FIG. 10, the response difference is a difference between the average value of the measured values of the plurality of terminals included in the group and the measured value to be monitored in each group. For example, response difference $\Delta$Ta1 of terminal A1 is a difference between average response time Tr–avrA which is an average value of response time Tr–a1 of terminal A1 and response time Tr–a2 of terminal A2. For example, response difference $\Delta$Ta2 of terminal A2 is a difference between average response time Tr–avrA which is an average value of response time Tr–a2 of terminal A2 and response time Tr–a2 of terminal A2. For example, response difference $\Delta$Tb1 of terminal B1 is a difference between an average response time Tr–avrB which is an average value of response time Tr–b1 of terminal B1 and response time Tr–b2 of terminal B2. For example, response difference $\Delta$Tb2 of terminal B2 is a difference between an average response time Tr–avrB which is an average value of response time Tr–b2 of terminal B1 and response time Tr–b2 of terminal B2. For example, response difference $\Delta$Tb1 of terminal B1 is a difference between an average response time Tr–avrB which is an average value of response time Tr–b1 of terminal B1 and response time Tr–b2 of terminal B2.

When the measured value is included in the abnormal first numerical range, abnormality determination unit 37 stores abnormal terminal information indicating an abnormal terminal (S124).

Next, abnormality determination unit 37 calculates an inter-group difference (S125), and stores the calculated inter-group difference in a storage device such as a memory (S126). The inter-group difference is a difference between the average response time of each group and an inter-group average time Tr–avrG which is an average value of all the response times of the plurality of terminals 10. For example, inter-group difference $\Delta$Tr–gA of group A is a difference between average response time Tr–avrA and inter-group average time Tr–avrG. For example, inter-group difference $\Delta$Tr–gB of group B is a difference between average response time Tr–avrB and inter-group average time Tr–avrG. For example, inter-group difference $\Delta$Tr–gC of group C is a difference between average response time Tr–avrC and inter-group average time Tr–avrG.

Next, abnormality determination unit 37 determines, for each of the plurality of terminals 10, whether or not terminal 10 is abnormal (S127). For each of the plurality of terminals 10, abnormality determination unit 37 determines whether or not the delay amount is greater than or equal to the first time based on the response difference in terminal 10, determines that terminal 10 with the delay amount greater than or equal to the first time is an abnormal terminal, and determines that the terminal with the delay amount less than the first time is a normal terminal. Note that the delay amount is an example of a measured value. The first time is an example of a first threshold.

For example, as illustrated in FIG. 11, abnormality determination unit 37 may calculate an absolute value of the difference between the response difference and a predetermined value $\alpha$ as the delay amount, determine that the delay (abnormality) has occurred in the terminal when the delay amount is $\frac{1}{2}$ or more of the predetermined value $\alpha$, and determine that the delay has not occurred (is normal) in the terminal when the delay amount is less than $\frac{1}{2}$ of the predetermined value $\alpha$.

Next, abnormality determination unit 37 determines whether or not each of the plurality of groups is abnormal (S128). For each of the plurality of groups, abnormality determination unit 37 determines whether or not the delay amount is the second time or more based on the inter-group difference in the group, determines a group having the delay amount of the second time or more as an abnormal group, and determines a group having the delay amount of less than the second time as a normal group. Note that the delay amount is an example of a measured value. The predetermined time is an example of a third threshold.

For example, as illustrated in FIG. 12, abnormality determination unit 37 may calculate an absolute value of a difference between the inter-group difference and the predetermined value $\beta$ as a delay amount, determine that a delay (abnormality) has occurred in the group when the delay amount is $\frac{1}{2}$ or more of the predetermined value $\beta$, and determine that no delay (normal) has occurred in the group when the delay amount is less than $\frac{1}{2}$ of the predetermined value $\beta$.

Accordingly, as illustrated in FIG. 13, it is determined that terminal A1, terminal B1, and terminal B2 are abnormal, and it is determined that terminal A2 and terminal C1 are normal. In addition, group A and group C are determined to be normal, and group B is determined to be abnormal.

Figure 14:
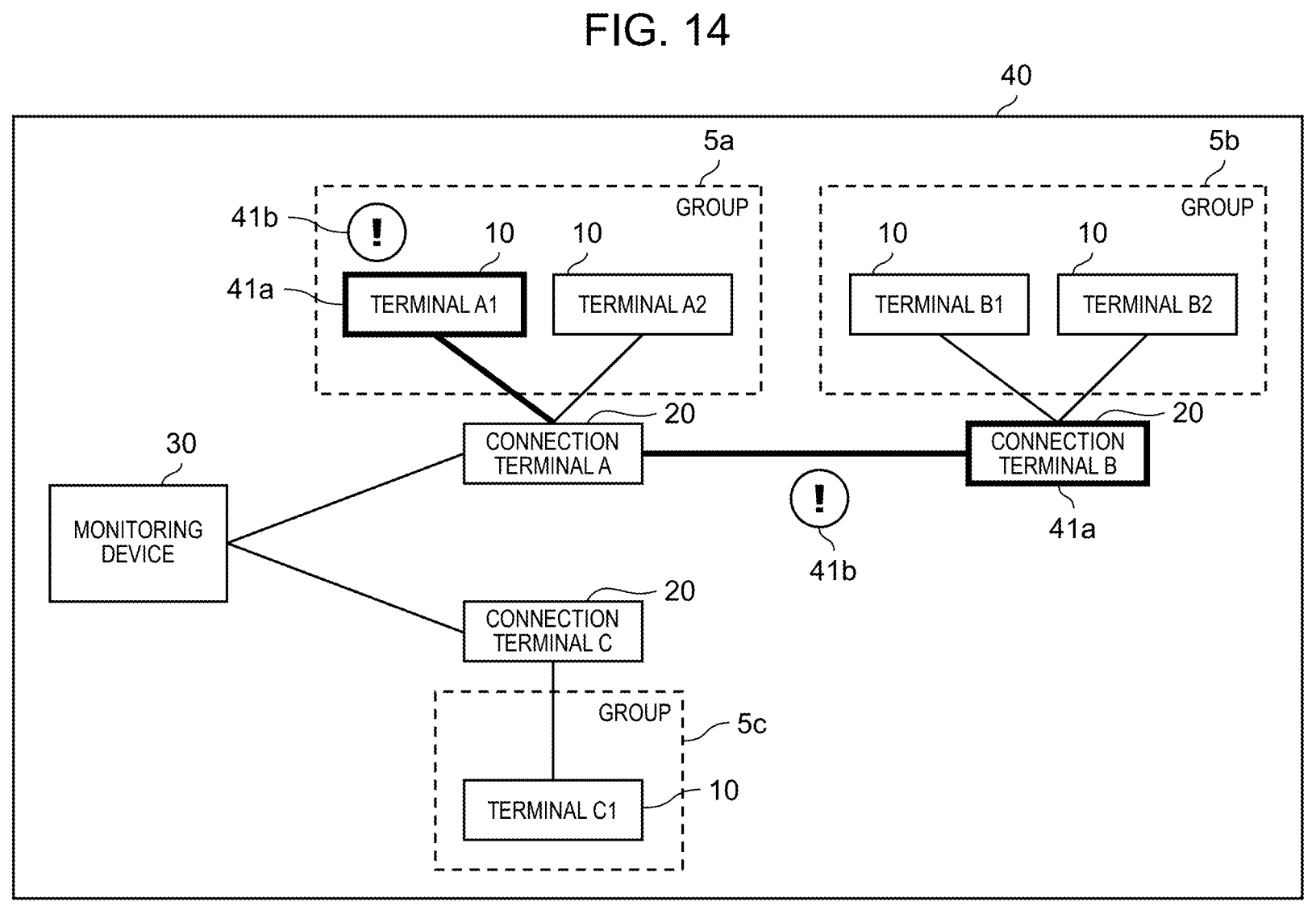

FIG. 14 is a diagram illustrating an example of the abnormality information and corresponds to the example of the failure determination illustrated in FIG. 13.

Abnormality information generation unit 39 acquires the determination result by abnormality determination unit 37 to generate abnormality information indicating that an abnormality has occurred in terminal A1 and group B. The abnormality information generated is displayed on display unit 40 together with a diagram schematically illustrating from monitoring device 30 to the end monitoring target. For example, as illustrated in FIG. 14, in the abnormality information, terminal A1 in which the abnormality has occurred and connection terminal B of group B in which the abnormality has occurred may be displayed with thick line 41*a*, and warning symbol 41*b* may be displayed. On the other hand, other normal terminals and other connection terminals are displayed with thin lines. Note that the occurrence of the abnormality in group B is indicated by displaying connection terminal B with a thick line, but the present invention is not limited thereto, and the occurrence of the abnormality in group B may be indicated by displaying a frame of a broken line of group 5*b* indicating group B with a thick line.

[1-3. Effects and the Like]

As described above, the abnormality monitoring system according to the present exemplary embodiment includes the plurality of terminals 10 and monitoring device 30 communicably connected to the plurality of terminals 10 via network 50. Monitoring device 30 transmits a request to the plurality of terminals 10. Monitoring device 30 receives one or more responses respectively transmitted by one or more terminals 10 among the plurality of terminals 10 in response to the request. Based on the one or more responses, when an abnormality has occurred in at least one of (i) one or more first terminals among the plurality of terminals 10 or (ii) one or more first communication routes among the plurality of communication routes between monitoring device 30 and the plurality of terminals 10, monitoring device 30 generates abnormality information indicating at least one of the one or more first terminals or the one or more first communication routes in which the abnormality has occurred. Monitoring device 30 presents the abnormality information generated. When receiving a request from monitoring device 30, each of the plurality of terminals 10 transmits a response according to the request to monitoring device 30.

According to this, in response to the request transmitted to the plurality of terminals 10, the abnormality information indicating at least one of the one or more first terminals or the one or more first communication routes in which the abnormality has occurred is generated based on the one or more responses respectively transmitted from the one or more terminals 10 among the plurality of terminals 10, and the abnormality information is presented. Therefore, the user can identify at least one of the one or more first terminals or the one or more first communication routes in which the abnormality has occurred among the plurality of terminals 10 and the plurality of communication routes only by confirming the presented abnormality information. That is, the user can easily identify whether an abnormality has occurred in terminal 10 to be monitored or an abnormality has occurred in a communication route on the network.

In addition, in the abnormality monitoring system, each of the one or more responses received by monitoring device 30 includes one or more pieces of device information indicating one or more communication devices on the network through which the response has passed between the terminal that has transmitted the response and monitoring device 30. Each of the plurality of communication routes is identified by one or more pieces of device information included in the response transmitted from terminal 10 corresponding to the communication route.

Accordingly, the communication route from the one or more terminals that have transmitted the one or more responses to monitoring device 30 is identified based on the one or more pieces of device information included in each of the one or more responses. For this reason, for example, it is possible to identify a communication route in which an abnormality has occurred by determining whether or not an abnormality has occurred in each of one or more communication devices.

Furthermore, in the abnormality monitoring system, the abnormality information is generated based on one or more measured values respectively corresponding to one or more terminals obtained by receiving one or more responses. One or more measured values are generated corresponding to one or more responses, respectively. Each of the one or more measured values correlates with the evaluation of the communication quality between the terminal that has transmitted the response corresponding to the measured value among the one or more responses and monitoring device 30.

According to this, the abnormality information is generated based on one or more measured values. Each of the one or more measured values correlates with the evaluation of the communication quality between terminal 10 corresponding to the measured value and monitoring device 30. Therefore, it is possible to accurately identify at least one of the one or more first terminals or the one or more first communication routes that have caused the abnormality.

Furthermore, in the abnormality monitoring system, in a case where the number of one or more terminals 10 from which monitoring device 30 has received the response is smaller than the number of the plurality of terminals 10, one or more other measured values different from one or more measured values among the plurality of measured values correspond to one or more other terminals different from one or more terminals among the plurality of terminals 10, respectively. In addition, the one or more other measured values are generated because monitoring device 30 has failed to receive the one or more other responses according to the request from the one or more other terminals in the predetermined period, and indicate that the one or more other measured values are lower than the evaluation of the communication quality of the one or more measured values.

According to this, since the evaluation of the one or more other measured values is determined to be lower than the evaluation of the one or more measured values, it is possible to determine that an abnormality has occurred in any of the one or more other terminals 10 corresponding to the response that monitoring device 30 has failed to receive in the predetermined period and the one or more communication routes between the one or more other terminals 10 and monitoring device 30. Therefore, it is possible to accurately identify at least one of the one or more first terminals or the one or more first communication routes that have caused the abnormality.

In the abnormality monitoring system, in the abnormality information, one or more first terminals respectively corresponding to one or more first measured values included in the first numerical range indicating that the evaluation of the communication quality is lower than the first threshold among the plurality of measured values are indicated as terminals in which an abnormality has occurred. The plurality of terminals 10 includes one or more first terminals.

Therefore, by receiving one or more responses, one or more first terminals having low evaluation of communication quality among the plurality of terminals 10 can be identified as terminals in which an abnormality has occurred.

Further, in the abnormality monitoring system, in the abnormality information, one or more second terminals respectively corresponding to one or more second measured values included in a second numerical range indicating that the evaluation of the communication quality is higher than the first threshold among the plurality of measured values are indicated as terminals in which no abnormality has occurred.

Therefore, by receiving a plurality of responses, one or more second terminals having high evaluation of communication quality among the plurality of terminals 10 can be identified as terminals in which no abnormality has occurred.

In the abnormality monitoring system, the plurality of terminals include a plurality of first group terminals belonging to the first group. The plurality of first group terminals communicate with monitoring device 30 via the first communication device among one or more communication devices. The plurality of measured values include a plurality of first group measured values respectively generated corresponding to the plurality of first group terminals. In the abnormality information, when each of the plurality of first group measured values is included in the third numerical range indicating that the evaluation of the communication quality is lower than the second threshold, the first communication route via the first communication device is indicated as the communication route in which the abnormality has occurred.

In a case where each of the plurality of first group measured values is included in the third numerical range indicating that the evaluation of the communication quality is lower than the second threshold, it is considered that the cause is a possibility that an abnormality has occurred in all of the plurality of first group terminals and a possibility that an abnormality has occurred in the first communication route. Therefore, in a case where each of the plurality of first group measured values is included in the third numerical range indicating that the evaluation of the communication quality is lower than the second threshold, it is possible to notify the user that there is a possibility that an abnormality has occurred also in the first communication route by indicating the first communication route as a communication route in which an abnormality has occurred in the abnormality information.

In the abnormality monitoring system, the plurality of terminals 10 further include a plurality of second group terminals belonging to the second group. The plurality of second group terminals communicate with monitoring device 30 via the second communication device among one or more communication devices. The plurality of measured values further include a plurality of second group measured values respectively generated corresponding to the plurality of second group terminals. In the abnormality information, when at least one of the plurality of second group measured values is included in the fourth numerical range indicating that the evaluation of the communication quality is higher than the second threshold, the second communication route through the second communication device is indicated as a communication route in which no abnormality has occurred.

In a case where at least one of the plurality of second group measured values is included in the fourth numerical range indicating that the evaluation of the communication quality is higher than the second threshold, it is considered that no abnormality has occurred in the second communication route. Therefore, in a case where at least one of the plurality of second group measured values is included in the fourth numerical range indicating that the evaluation of the communication quality is higher than the second threshold, it is possible to notify the user that no abnormality has occurred in the second communication route by indicating the second communication route as a communication route in which no abnormality has occurred in the abnormality information.

In the abnormality monitoring system, in the abnormality information, one or more first terminals in which an abnormality has occurred are indicated in a display mode different from that of other terminals in which an abnormality has not occurred, and one or more first communication routes in which an abnormality has occurred are indicated in a display mode different from that of other communication routes in which an abnormality has not occurred.

Therefore, the user can distinguish and visually recognize the terminal in which the abnormality has occurred and the terminal in which the abnormality has not occurred. In addition, the user can distinguish and visually recognize a communication route in which an abnormality has occurred and a communication route in which no abnormality has occurred.

In addition, in the abnormality monitoring system, the priority of abnormality determination may be set according to each type or each group of terminals by the user who manages the terminal to be monitored. As a result, the frequency of transmitting the request by transmitting the request to the terminal can be adjusted for each type or group of the terminal according to the set priority. Therefore, even if the number of terminals to be monitored increases, by scheduling request transmission, it is possible to reduce concentration of a communication load related to a communication process of transmitting a request and receiving a response.

Other Exemplary Embodiments

Hereinafter, differences from the above exemplary embodiment will be mainly described with reference to FIGS. 15 to 18, and the description of the same configuration may be omitted.

Figure 15:
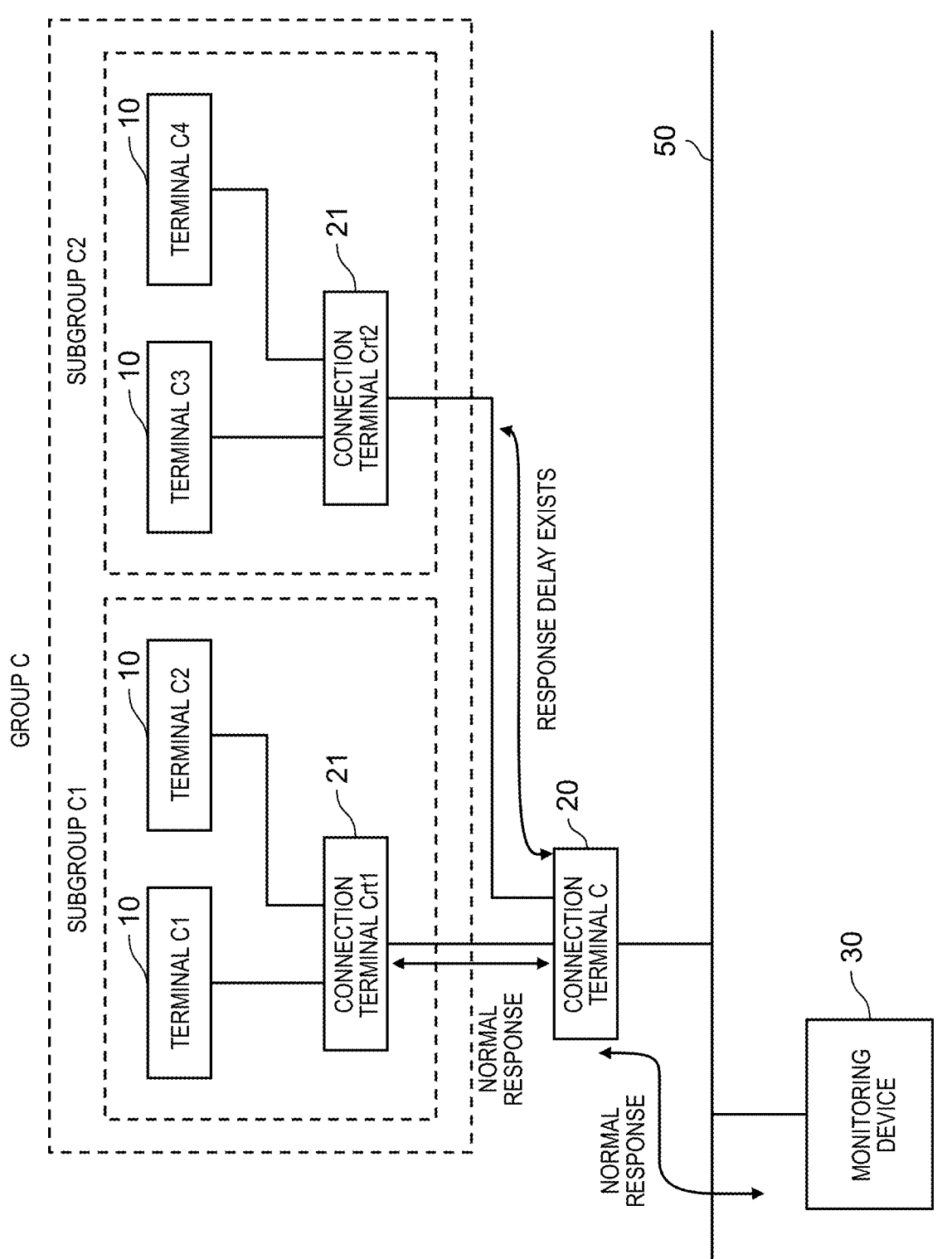
FIG. 15 is a block diagram illustrating a configuration of an abnormality monitoring system according to another exemplary embodiment.

FIG. 15 is a block diagram illustrating a configuration of an abnormality monitoring system according to another exemplary embodiment. In the abnormality monitoring system according to the present exemplary embodiment, two subgroups of subgroup C1 and subgroup C2 are connected to connection terminal C connected to network 50. Connection terminal 21 (connection terminal Crt1) connected to connection terminal 20 (connection terminal C) and terminal 10 (terminal C1 and terminal C2) connected to connection terminal 21 belong to subgroup C1. Connection terminal 21 (connection terminal Crt2) connected to connection terminal 20 (connection terminal C) and terminal 10 (terminal C3 and terminal C4) connected to connection terminal 21 belong to subgroup C2. Group C is managed by group management unit 36 in monitoring device 30 as a group configured by subgroup C1 and subgroup C2.

Connection terminal 20 is a router having a MAC address, and is a connection terminal capable of changing a response to the route information request. On the other hand, connection terminal 21 is a network hub that only performs branching, and is a connection terminal that does not return a response to the request for the route information because it does not have a MAC address.

Here, since connection terminal 21 does not return a response to the route information request from monitoring device 30, route identification unit 33 cannot recognize the communication route corresponding to subgroup C1 and the communication route corresponding to subgroup C2. That is, when the route information request is simply transmitted, route identification unit 33 identifies the route information as a communication route to terminal 10 as illustrated in FIG. 16. Therefore, route management unit 38 compares the communication route information identified by route identification unit 33 illustrated in FIG. 16 with the group management information of each terminal information managed by terminal management unit 34 illustrated in FIG. 17. Then, when there is a difference, it is determined that there is a connection terminal route, and new route information including a temporary connection terminal route illustrated in FIG. 18 is created and identified as new route information. That is, monitoring device 30 determines that group C includes subgroup C1 and subgroup C2 based on the group management information stored in terminal management unit 34. The monitoring device 30 identifies a first temporary communication route (Route C⇒Route C1 (temporary)) corresponding to subgroup C1 and a second temporary communication route (Route C⇒ Route C2 (temporary)) corresponding to subgroup C2.

As illustrated in FIG. 18, the response time (an example of the first subgroup measured value) from terminal C1, C2 is Tc1, and the response time (an example of the second subgroup measured value) from terminal C3, C4 is Tc2. When the relationship of Tc1<Tc2 is satisfied, it is determined that a response delay exists on the route to terminal 10 with the response time of Tc2. In this case, it is determined that some kind of abnormality has occurred in connection terminal 21 (terminal C3 and terminal C4) of "Route C2 (temporary)" from the newly created route information. That is, when response time (Tc2) corresponding to terminal C3, C4 is longer than response time (Tc1) corresponding to terminal C1, C2, monitoring device 30 generates abnormality information indicating that an abnormality (response delay) has occurred in the second temporary communication route. In one example, when Tc2 is 10% or more larger than Tc1, monitoring device 30 determines that a response delay exists in the second temporary communication route. This makes it possible to detect a state of a connection terminal that does not exist in the acquired route information but does not return a response that actually exists.

Thus, in general, there is a case where a place where terminal 10 is installed is different, or management of terminal is managed by a group in order for an administrator to easily manage terminal 10. In this case, the route from the monitoring device 30 to the terminal is branched using an inexpensive connection terminal that does not have a MAC address. In such a case, by replacing the group management information of the terminal with a virtual connection terminal, it is possible to monitor the state of the connection terminal that does not exist in the route information.

Although the abnormality monitoring system and the like according to the exemplary embodiment of the present disclosure have been described above, the present disclosure is not limited to this exemplary embodiment.

In addition, each processing unit included in the abnormality monitoring system, the monitoring device, the terminal, the connection terminal, and the like according to the above exemplary embodiment is typically implemented as an LSI which is an integrated circuit. These processing units may be individually integrated into one chip, or some or all of the processing units may be integrated into one chip.

The circuit integration is not limited to the LSI, and may be implemented by a dedicated circuit or a general-purpose processor. The circuit integration may be implemented using a field programmable gate array (FPGA) that can be programmed after manufacturing of an LSI or a reconfigurable processor in which connections and settings of circuit cells inside an LSI can be reconfigured.

In addition, the present disclosure may be realized as an abnormality monitoring method executed by an abnormality monitoring system, an image processing device, a terminal, or the like.

The division of the functional blocks in the block diagram is an example, and a plurality of functional blocks may be implemented as one functional block, one functional block may be divided into a plurality of functional blocks, or some functions may be transferred to another functional block. Then, functions of a plurality of functional blocks having similar functions may be processed in parallel or in a time division manner by single hardware or software.

The flowchart shows each of steps being performed in order for specifically illustrating the present disclosure, and thus each step may be performed in order other than the above. Alternatively, some of the steps above may be performed simultaneously (in parallel) with another step.

Although the image processing system, the image processing device, the server, the display device, and the like according to one or more aspects have been described above based on the exemplary embodiment, the present disclosure is not limited to this exemplary embodiment. Configurations in which various modifications conceivable by those skilled in the art are applied to the present exemplary embodiment and configurations constructed by combining components in different exemplary embodiments may also be included in the scope of one or more aspects without departing from the gist of the present disclosure.

The present disclosure is applicable to an abnormality monitoring system that monitors a communication state of a terminal installed on a network.

What is claimed is:

1. An abnormality monitoring method by a monitoring device communicably connected to a plurality of terminals via a network, the method comprising:

transmitting a request to the plurality of terminals via a plurality of communication routes between the monitoring device and the plurality of terminals;

receiving one or more responses respectively transmitted in response to the request by one or more terminals of the plurality of terminals;

determining, based on the one or more responses, whether or not an abnormality has occurred in at least one of (i) a first terminal of the plurality of terminals or (ii) a first communication route of the plurality of communication routes;

generating abnormality information indicating that the abnormality has occurred in at least one of the first terminal or the first communication route when the abnormality has occurred;

presenting the abnormality information generated, wherein the abnormality information is generated based on one or more measured values respectively corresponding to the one or more terminals, the one or more measured values being obtained by receiving the one or more responses, wherein the plurality of terminals include a plurality of first group terminals belonging to a first group, wherein the abnormality monitoring method further includes:

determining that the first group includes a first subgroup and a second subgroup based on group management information stored in the monitoring device; and identifying a first temporary communication route corresponding to the first subgroup and a second temporary communication route corresponding to the second subgroup, and wherein when a second subgroup measured value corresponding to a second subgroup terminal belonging to the second subgroup is larger than a first subgroup measured value corresponding to a first subgroup terminal belonging to the first subgroup, the abnormality information indicates that the abnormality has occurred in the second temporary communication route.

2. The abnormality monitoring method according to claim 1, wherein each of the one or more responses received by the monitoring device includes one or more pieces of device information indicating one or more communication devices on the network, the response having passed the one or more communication devices between a terminal that has transmitted the response of the one or more terminals and the monitoring device, and each of the plurality of communication routes is identified by the one or more pieces of device information included in the response transmitted from the terminal corresponding to the communication route.

3. The abnormality monitoring method according to claim 1, further comprising:

generating the one or more measured values respectively corresponding to the one or more responses; and correlating each of the one or more measured values with evaluation of communication quality between a terminal of the one or more terminals corresponding to the measured value and the monitoring device.

4. The abnormality monitoring method according to claim 3, wherein the plurality of terminals include the one or more terminals and one or more other terminals different from the one or more terminals, and one or more other measured values corresponding to the one or more other terminals are generated when the monitoring device fails to receive one or more other responses from the one or more other terminals in response to the request in a predetermined period, and indicate that the one or more other measured values are lower than the evaluation of the communication quality of the one or more measured values.

5. The abnormality monitoring method according to claim 4, wherein when a first measured value corresponding to the first terminal is included in a first numerical range indicating that the evaluation of the communication quality is lower than a first threshold, the abnormality information indicates that the abnormality has occurred in the first terminal.

6. The abnormality monitoring method according to claim 5, wherein when a second measured value corresponding to a second terminal is included in a second numerical range indicating that the evaluation of the communication quality is higher than the first threshold, the abnormality information indicates that the abnormality has not occurred in the second terminal.

7. The abnormality monitoring method according to claim 4, wherein the plurality of first group terminals communicate with the monitoring device via a first communication device and the first communication route, and when each of a plurality of first group measured values corresponding to the plurality of first group terminals is included in a third numerical range indicating that the evaluation of the communication quality is lower than a second threshold, the abnormality information indicates that the abnormality has occurred in the first communication route.

8. The abnormality monitoring method according to claim 7, wherein the plurality of terminals further include a plurality of second group terminals belonging to a second group, the plurality of second group terminals communicate with the monitoring device via a second communication device and a second communication route, and when at least one of a plurality of second group measured values corresponding to the plurality of second group terminals is included in a fourth numerical range indicating that the evaluation of the communication quality is higher than the second threshold, the abnormality information indicates that the abnormality has not occurred in the second communication route.

9. The abnormality monitoring method according to claim 3, wherein each of the one or more measured values is a response period from a first time at which the monitoring device has transmitted the request to the terminal corresponding to the measured value to a second time at which the monitoring device receives a response transmitted by the terminal.

10. The abnormality monitoring method according to claim 3, wherein each of the one or more responses includes a number of times of retransmission of the response by the terminal corresponding to the response, and each of the one or more measured values is a number of times of retransmission included in the response corresponding to the measured value.

11. The abnormality monitoring method according to claim 3, wherein each of the one or more responses includes a number of times of errors that have occurred in transmission of the response by the terminal corresponding to the response, and each of the one or more measured values is a number of times of errors included in the response corresponding to the measured value.

12. The abnormality monitoring method according to claim 3, wherein each of the one or more measured values is a number of times of retransmission of the request by the monitoring device to the terminal corresponding to the measured value.

13. The abnormality monitoring method according to claim 3, wherein each of the one or more measured values is a number of times of errors that have occurred in transmission of the request by the monitoring device to the terminal corresponding to the measured value.

14. The abnormality monitoring method according to claim 1, further comprising:

indicating the first terminal in which the abnormality has occurred in a display mode different from a display mode of another terminal in which the abnormality has not occurred in the abnormality information; and indicating the first communication route in which the abnormality has occurred in a display mode different from a display mode of another communication route in which the abnormality has not occurred in the abnormality information.

15. A non-transitory recording medium storing a program for causing a computer to execute the abnormality monitoring method according to claim 1.

16. An abnormality monitoring system comprising:

a plurality of terminals; and a monitoring device communicably connected to the plurality of terminals via a network, wherein the monitoring device transmits a request to the plurality of terminals via a plurality of communication routes between the monitoring device and the plurality of terminals, each of the plurality of terminals transmits a response in response to the request to the monitoring device when receiving the request from the monitoring device, and the monitoring device receives one or more responses respectively transmitted in response to the request by one or more terminals of the plurality of terminals, determines, based on the one or more responses, whether or not an abnormality has occurred in at least one of (i) a first terminal of the plurality of terminals or (ii) a first communication route of the plurality of communication routes, generates abnormality information indicating that the abnormality has occurred in at least one of the first terminal or the first communication route when the abnormality has occurred, and presents the abnormality information generated, wherein the abnormality information is generated based on one or more measured values respectively corresponding to the one or more terminals, the one or more measured values being obtained by receiving the one or more responses, wherein the plurality of terminals include a plurality of first group terminals belonging to a first group, wherein the monitoring device further determines that the first group includes a first subgroup and a second subgroup based on group management information stored in the monitoring device, and identifies a first temporary communication route corresponding to the first subgroup and a second temporary communication route corresponding to the second subgroup, and wherein when a second subgroup measured value corresponding to a second subgroup terminal belonging to the second subgroup is larger than a first subgroup measured value corresponding to a first subgroup terminal belonging to the first subgroup, the abnormality information indicates that the abnormality has occurred in the second temporary communication route.

* * * * *